United States Patent Office 2,965,817
Patented Dec. 20, 1960

2,965,817

ELECTROLYTES FOR ELECTROLYTIC CAPACITORS

Raymond C. Petersen, Williamstown, Mass., assignor to Sprague Electric Company, North Adams, Mass., a corporation of Massachusetts No Drawing. Filed June 24, 1958, Ser. No. 744,067

8 Claims. (Cl. 317—230)

This invention relates to electrolytic capacitors having a dielectric film formed on an anode of a so-called valve metal upon immersion of the anode in an electrolyte and application of an electric current, and more particularly to an electrolyte for use in such a capacitor.

Electrolytes which are suitable for forming oxides on valve metals such as aluminum and tantalum are preferably also suitable as electrolytes in the working operation of the electrolytic capacitor containing anodes of the aluminum or tantalum. For example, it is desirable that electrolyte systems be usable both at the forming voltages of electrolytic capacitors and at the working voltages of the same electrolytic capacitors. Further, it is desirable that electrolytes operate as working electrolytes through a wide range of temperature from as low as −50° C. to as high as 200° C. A consideration in electrolytic capacitor electrolytes is the specific resistance of the working electrolyte. To be useful as a working electrolyte, the electrolyte should have a relatively low resistivity. The resistivity is preferably of the order of a few thousand ohm-centimeters or less. An electrolyte suitable for the formation of the dielectric oxide on the surface of a valve metal anode preferably oxidizes the valve metal to a high potential.

It is an object of this invention to provide an electrolyte system having a suitably low specific resistivity.

It is another object of this invention to provide an electrolyte system having valve metal forming properties at high voltages, of the order of 500 volts or even higher.

It is a further object of this invention to provide an electrolyte system in which a forming electrolyte and a working electrolyte may be obtained from the same electrolyte system.

Further objects of this invention will become more apparent upon consideration of the following description.

The electrolyte of this invention has as a solvent a substituted amide of an organic acid other than formic acid. Such a substituted amide of an organic acid has the following general formula:

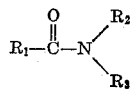

wherein $R_1$ represents an organic radical and $R_2$ and $R_3$ represent H or any organic radical except that $R_2$ and $R_3$ may not both represent H. It is desirable for ordinary purposes that such a substituted amide be selected that is liquid at 25° C. In such a solvent the electrolyte of this invention contains such suitable solutes as boric acid and salts of boric acid. One preferred class of solutes are the substituted ammonium pentaborates.

It has been previously suggested that unsubstituted amides of organic acids be incorporated in electrolytes for electrolytic capacitors. These are not suitable as components of electrolytic capacitor electrolytes in the concept of this invention. The unsubstituted amides of organic acids are solids at room temperature, with the exception of formamide, which, in combination with boric acid, fails the electrolytic oxidation test at a potential below 100 volts on an aluminum anode. Accordingly, unsubstituted amides of organic acids are unsatisfactory as electrolyte solvents for electrolytic capacitors. Similarly, substituted amides of formic acid are not suitable as solvents in the electrolyte of this invention as they do not provide suitable electrolytic oxidation of the valve metal in accordance with this invention. Substituted amides of organic acids except of formic acid are the solvents for the electrolytes of this invention. It has been discovered that these substituted amides of organic acids excluding formic acid do result in an electrolyte system which is operable both as a forming electrolyte and as a working electrolyte, even at high voltages. Furthermore, many of these amides have low freezing points and high boiling points, thereby rendering their solutions useful at both high and low temperatures.

It has been discovered that electrolytes having a substituted amide of this invention may be used with various concentrations of boric acid, or borate salts and with a water content ranging up to 5 percent by weight. Valve metals have been formed with an oxide layer by electrolytic oxidation in the electrolyte. This formation involves an electrolytic oxidation by a current through an electrolytic cell in which the valve metal is the anode. The voltage is applied across the cell and is increased with time to maintain the current density constant as the oxidation of the valve metal progresses. It is customary to employ a current density of 1 ma./cm.² in this type of test. In the electrolytic oxidation the formation of the oxide film results in a condition under which the voltage across the cell needs to be increased with time to maintain the current density constant. The highest potential which may be impressed across the cell under these conditions is referred to as the maximum formation voltage. The electrolytic oxidation process is referred to as forming. As pointed out above the maximum formation voltage for a valve metal at a given current density is dependent on the nature of the electrolyte.

It has been found that the substituted amide solvent of this invention with a suitable solute permits electrolytic oxidation to sufficiently high voltages to be useful as electrolytes in the formation of oxide films on valve metals. It has been found that the substituted amide solvents of this invention are usable in electrolytes as forming electrolytes in contradistinction to substituted amides of formic acid, which fail to form anodes to a sufficiently high voltage. The following examples are illustrative of the application of the invention to the formation of an oxide film on valve metals and are not limitative of the invention.

Example I

An aluminum anode was placed in an electrolytic cell containing a solution of 16.3 gms. of boric acid and 1.3 gms. of water in 79.9 gms. of N,N-dimethylacetamide. A current was passed through the cell including the aluminum anode. A current density of 1 ma./cm.² was maintained constant in the cell by a potential which was increased with time up to 590 volts. At 590 volts the maximum formation voltage was attained. Thus, the electrolyte of this invention produced a dielectric oxide film on an aluminum surface to a potential of 590 volts.

Example II

An aluminum anode was inserted in a solution of 5.2 gms. of boric acid and 1.8 gms. of water in 90.0 gms. of N-ethylacetamide in an electrolytic cell and subjected to electrolytic oxidation. A potential was applied and increased to 550 volts to maintain a constant current density of 1 ma./cm.². At 550 volts the maximum formation voltage had not yet been attained. The aluminum surface was formed with an oxide as a result of the electrolytic oxidation, and current decreased rapidly with time at a constant potential of 550 volts.

*Example III*

A saturated solution of boric acid in N-methylpropionamide without added water was placed in an electrolytic cell with an aluminum anode and the surface of the aluminum anode was electrolytically oxidized by a current through the cell and the anode. A potential was applied and increased up to 550 volts to maintain a constant current density of 1 ma./cm.$^2$. Again this does not represent the maximum formation voltage, and again the current decreased rapidly with time at 550 volts.

These Examples I, II, III are just a few of several cases in which solutions of boric acid in various amides of this invention have been used to oxidize aluminum anodes electrolytically. A wide range of boric acid concentrations has been employed, and water has been added in varying concentrations from 0 to 5% by weight. It should be noted that such solutions can be prepared having specific resistivities far lower than can be obtained with purely aqueous boric acid solutions. In every case in which aluminum anodes have been electrolytically oxidized in a solution of boric acid in one of the amides of this invention, the maximum formation voltage has been at least 550 volts.

The distinction made between the substituted amides of this invention and the amides of formic acid is illustrated by a comparison of the above Examples I, II, III, with the following examples of electrolyte systems outside the scope of this invention.

(a) A solution of 5.0 gms. of boric acid in 87.9 gms. of formamide was placed in an electrolytic cell with an aluminum anode and electrolyzed to form an oxide film on the anode. A potential was applied to maintain a constant current density of 1 ma./cm.$^2$ and this potential increased with time to 60 volts, which was the maximum formation voltage. The experiment was repeated using a new aluminum anode and adding 3% water to the electrolyte. The maximum formation voltage was now 77 volts.

(b) A solution of 15.5 gms. of boric acid in 64.5 gms. of N,N-dimethylformamide was electrolyzed in an electrolytic cell with an aluminum anode. The aluminum surface was electrolytically oxidized to form an oxide film. A potential was applied to maintain a constant current density of 1 ma./cm.$^2$ and increased with time until the maximum formation voltage of 170 volts was achieved.

(c) A solution of 5.1 gms. of boric acid in 76.9 gms. of N,N-diethylformamide was used in the electrolytic oxidation of an aluminum anode. At a constant current density of 1 ma./cm.$^2$ the maximum formation voltage attained was 211 volts.

(d) A solution of 5.0 gms. of boric acid in 74.0 gms. of N-ethylformamide was used in the electrolytic oxidation of an aluminum anode. At a constant current density of 1 ma./cm.$^2$ the maximum formation voltage attained was 248 volts.

The above Examples a, b, c, and d demonstrate the general failure of electrolytes with formamide and substituted formamide solvents to achieve maximum formation voltages as high as 250 volts on aluminum anodes. The marked inferiority of formamide and substituted formamides, relative to the substituted amides of this invention, has thus been illustrated.

The electrolyte solvent of this invention is applicable to the electrolytic oxidation of other valve metals, for example, tantalum. The following examples are illustrative of the formation of tantalum anodes.

*Example IV*

A solution of 18.5 gms. of boric acid in 56.7 gms. of N,N-dimethylacetamide and a tantalum anode were subjected to an electric current electrolytically oxidizing the tantalum surface. A potential was applied and increased to 435 volts to maintain the current at a constant density of 1 ma./cm.$^2$. The potential of 435 volts was the maximum formation voltage.

This is only one example of several experiments in which tantalum anodes were electrolytically oxidized in solutions of boric acid in one of the amides of this invention, with and without added water. In every other such case, the maximum formation voltage exceeded 435 volts, with some exceeding 500 volts. This is to be contrasted with the following example of an electrolyte system falling outside the scope of this invention.

(e) A tantalum anode in a solution of 5.0 gms. of boric acid in 87.9 gms. of formamide with 3% added water was subjected to an electrolyzing current to oxidize the tantalum anode. A potential was applied to maintain the current at a constant density of 1 ma./cm.$^2$ and increased to 273 volts which was the maximum formation voltage attainable.

This is only one example of several experiments in which tantalum anodes were electrolytically oxidized in solutions of boric acid in formamide and substituted formamides, with and without added water. In no other such case was a maximum formation voltage as high as 273 volts reached, illustrating again, this time with tantalum anodes, the vast difference between the amides of this invention and the various formamides.

Suitable solutes of the electrolyte system with a substituted amide solvent of this invention include salts of boric acid as well as boric acid itself. The following examples illustrate electrolyte systems of a substituted ammonium borate and a substituted amide of this invention in the electrolytic oxidation of a valve metal anode.

*Example V*

A saturated solution of tetra allyl ammonium pentaborate in N,N-dimethylacetamide made up an electrolyte system which was contained in an electrolytic cell having an aluminum anode. An electrolyzing current of a density of 1 ma./cm.$^2$ was passed through the cell and the anode at a potential continuously increased to maintain the current density constant. The maximum formation voltage attained was 545 volts.

*Example VI*

An electrolyte system of a cinnamyl triethyl ammonium borate dissolved in N,N-dimethylacetamide was contained in an electrolytic cell with an aluminum anode. An electrolyzing current was applied to the cell to form a dielectric oxide coating on the aluminum surface. A potential was applied to the cell and increased up to 475 volts to maintain a constant current density of 1 ma./cm.$^2$. This was not the maximum formation voltage attainable.

It should be noted that salts of boric acid are preferable to boric acid itself in some applications, since their use permits greater versatility in preparing an electrolyte of a desired resistivity. Electrolytes comprising a solution of a substituted ammonium salt of boric acid in an amide of this invention have been prepared with specific resistivities less than 1000 ohm-centimeters.

The electrolyte systems of this invention permit the electrolytic oxidation of aluminum and tantalum to high voltages. Such systems may also be prepared with specific resistivities such that they are useful as working electrolytes in electrolytic capacitors. As a result these electrolyte systems are available for use both as forming and as working electrolytes. Furthermore, electrolyte systems of this invention may be prepared which are operable over a wide temperature range. For example, electrolytes may be prepared using N-methylpropionamide which are liquid from below −50° C. to above 200° C.

The solvents of this invention may be used in combination with a variety of solutes, and various mixtures of solvents may be employed, thereby affording a wide range of physical properties (with respect to viscosity, resistivity, freezing point, boiling point, for example) from which various systems may be selected for specific applications. Two preferred solvents of this invention are N,N-dimethyl-acetamide and N-methylpropionamide.

Specific solvents have been described above for the purpose of illustration. It will be understood that this invention extends to any electrolyte solvent made up of a substituted amide of an organic acid except formic acid. The solvent is incorporated into an electrolyte system of an electrolytic capacitor. Accordingly, it is intended that the invention be limited only by the scope of the appended claims.

What is claimed is:

1. An electrolytic capacitor comprising an electrolyte having an ionogen from the group consisting of boric acid and salts of boric acid, and an electrolyte solvent which is an N-substituted amide of an organic acid other than formic acid having the general formula:

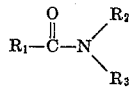

wherein $R_1$ and $R_2$ are radicals from the group consisting of methyl and ethyl, and $R_3$ is a radical selected from the group consisting of hydrogen and methyl and a plurality of electrodes of which at least one is composed of a valve metal, said electrolyte being in contact with said electrodes.

2. A capacitor as described in claim 1 in which the valve metal is aluminum.

3. A capacitor as described in claim 1 in which the valve metal is tantalum.

4. A capacitor as described in claim 1 in which the electrolyte solvent is N,N-dimethylacetamide.

5. A capacitor as described in claim 1 in which the electrolyte solvent is N-methylpropionamide.

6. A capacitor as described in claim 1 in which the electrolyte solvent is a mixture of more than one N-substituted amides of organic acids other than formic acid.

7. A capacitor as described in claim 1 to which not more than 5% by weight of water has been added.

8. An electrolyte having an electrolyte solute from the group consisting of boric acid and salts of boric acid, and an electrolyte solvent consisting essentially of an N-substituted amide of an organic acid other than formic acid having the general formula:

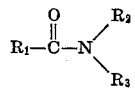

wherein $R_1$ and $R_2$ are radicals from the group consisting of methyl and ethyl, and $R_3$ is a radical selected from the group consisting of hydrogen and methyl.

References Cited in the file of this patent

UNITED STATES PATENTS

| | | |
|---|---|---|
| 2,165,091 | Clark | July 4, 1939 |
| 2,168,156 | Clark | Aug. 1, 1939 |
| 2,321,997 | Compton | June 15, 1943 |

OTHER REFERENCES

The Condensed Chemical Dictionary, 5th ed., 1956, Reinhold Pub., New York, p. 388.

UNITED STATES PATENT OFFICE
CERTIFICATION OF CORRECTION

Patent No. 2,965,817                                  December 20, 1960

Raymond C. Petersen

It is hereby certified that error appears in the above numbered patent requiring correction and that the said Letters Patent should read as corrected below.

Column 2, line 56, for "1.3" read -- 1.8 --.

Signed and sealed this 16th day of May 1961.

(SEAL)
Attest:

ERNEST W. SWIDER
Attesting Officer

DAVID L. LADD
Commissioner of Patents